United States Patent
Geshi et al.

(10) Patent No.: US 12,444,790 B2
(45) Date of Patent: Oct. 14, 2025

(54) ELECTRICITY STORAGE DEVICE

(71) Applicant: Panasonic Intellectual Property Management Co., Ltd., Osaka (JP)

(72) Inventors: Shinya Geshi, Osaka (JP); Yoshiyuki Okamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 572 days.

(21) Appl. No.: 17/904,193

(22) PCT Filed: Feb. 19, 2021

(86) PCT No.: PCT/JP2021/006495
§ 371 (c)(1),
(2) Date: Aug. 12, 2022

(87) PCT Pub. No.: WO2021/172235
PCT Pub. Date: Sep. 2, 2021

(65) Prior Publication Data
US 2023/0065382 A1    Mar. 2, 2023

(30) Foreign Application Priority Data
Feb. 28, 2020   (JP) ................................. 2020-034473

(51) Int. Cl.
*H01M 50/107*   (2021.01)
*H01M 50/186*   (2021.01)
*H01M 50/566*   (2021.01)

(52) U.S. Cl.
CPC ....... *H01M 50/107* (2021.01); *H01M 50/186* (2021.01); *H01M 50/566* (2021.01); *H01M 2220/20* (2013.01)

(58) Field of Classification Search
CPC ............. H01M 50/107; H01M 50/186; H01M 50/566; H01M 2220/20
(Continued)

(56) References Cited

U.S. PATENT DOCUMENTS

| 6,524,739 B1 | 2/2003 | Iwaizono et al. |
| 2011/0177368 A1 | 7/2011 | Maguire |

(Continued)

FOREIGN PATENT DOCUMENTS

| EP | 1026761 A1 | 8/2000 |
| JP | 9-092236 A | 4/1997 |

(Continued)

OTHER PUBLICATIONS

English Translation of Chinese Office Action dated Feb. 29, 2024 for the related Chinese Patent Application No. 202180007174.9.
(Continued)

*Primary Examiner* — Kevin P Kerns
(74) *Attorney, Agent, or Firm* — Rimon P.C.

(57) ABSTRACT

An electricity storage device includes: an electrode group including first and second electrodes; a case accommodating the electrode group therein, the case having an opening provided therein; and a sealing body covering the opening of the case. The case includes a tubular part, a curved part connected to one end of the tubular part, and a bottom part closing another end of the tubular part. The curved part includes an opening rim, a crimp part connected to the opening rim, and a groove part connected to the crimp part, the crimp part being located outward from the opening rim along a radial direction of the tubular part, the groove part being recessed to protrude inward in the radial direction of the tubular part and having an annular shape. The sealing body includes: a sealing plate having conductivity; and a gasket having electric insulation, the gasket being com- (Continued)

pressed between the sealing plate and a portion of the crimp part facing the groove part and between the sealing plate and an inner surface of the groove part. The case is electrically connected to the first electrode. The sealing plate is electrically connected to the second electrode. The opening rim does not contact the gasket.

5 Claims, 13 Drawing Sheets

(58) Field of Classification Search
USPC .................................................. 429/122, 163
See application file for complete search history.

(56) References Cited

U.S. PATENT DOCUMENTS

| | | | |
|---|---|---|---|
| 2018/0047973 A1 | 2/2018 | Kunoike et al. |
| 2020/0358048 A1 | 11/2020 | Kim et al. |
| 2021/0175568 A1 | 6/2021 | Geshi et al. |
| 2021/0257704 A1 | 8/2021 | Sawada et al. |

FOREIGN PATENT DOCUMENTS

| | | |
|---|---|---|
| JP | 2000-149918 | 5/2000 |
| JP | 2001-313011 A | 11/2001 |
| JP | 2002-008602 A | 1/2002 |
| JP | 2011-060644 | 3/2011 |
| WO | 2016/157749 | 10/2016 |
| WO | 2019/074199 A1 | 4/2019 |
| WO | 2019/194055 A1 | 10/2019 |
| WO | 2019/244392 A1 | 12/2019 |

OTHER PUBLICATIONS

International Search Report of PCT application No. PCT/JP2021/006495 dated Apr. 27, 2021.
The EPC Office Action dated Aug. 2, 2023 for the related European Patent Application No. 21759815.0.
The Indian Office Action dated Jan. 20, 2023 for the related Indian Patent Application No. 202247053748.

ELECTRICITY STORAGE DEVICE

TECHNICAL FIELD

The present disclosure relates to an electricity storage device.

BACKGROUND ART

Electricity storage devices have been broadly used as driving sources typically in vehicles and electronic apparatuses. In general, an electricity storage device includes a case accommodating therein an electrode group including a first electrode and a second electrode and having an opening, and a sealing body covering the opening of the case. In the case that the first electrode is electrically connected to the case, the second electrode is provided on the sealing body and connected to a terminal electrically insulated from the case.

To prepare a module of plural electricity storage devices, from the viewpoint of simplifying a collector structure, a first collector member electrically connected to the first electrode and a second collector member electrically connected to the second electrode are preferably arranged toward the opening of the electricity storage device. In this case, the first collector member is preferably welded onto a rim of the opening of the case and the second collector member is preferably welded onto a terminal of the sealing body.

PTL 1 discloses a cylindrical battery as a rechargeable battery. The cylindrical battery includes an electrode body, a cylindrical external can, and a sealing body crimped and fixed to an opening of the external can via a gasket. The sealing body is crimped and fixed with the gasket in the cylindrical battery.

CITATION LIST

Patent Literature

PTL 1: International Publication WO 2016/157749

SUMMARY OF THE INVENTION

Technical Problem

In PTL 1, a rim of the opening of the case is crimped to an outer periphery of a sealing lid via the gasket. Therefore, the rim of the opening is pressed onto the gasket and securely contacts the gasket. When the first collector member is welded onto the rim of the opening of the case in this structure, the gasket may deteriorate due to heat at the welding. Upon deteriorating, the gasket may cause a sealing property achieved by crimping to degrade.

An object of the present disclosure is to suppress deterioration of a gasket provided in a sealing body of an electricity storage device.

Solution to Problem

An electricity storage device in accordance with one aspect of the present disclosure includes: an electrode group including first and second electrodes; a case accommodating the electrode group therein, the case having an opening provided therein; and a sealing body covering the opening of the case. The case includes a tubular part, a curved part connected to one end of the tubular part, and a bottom part closing another end of the tubular part. The curved part includes an opening rim, a crimp part connected to the opening rim, and a groove part connected to the crimp part, the crimp part being located outward from the opening rim along a radial direction of the tubular part, the groove part being recessed to protrude inward in the radial direction of the tubular part and having an annular shape. The sealing body includes: a sealing plate having conductivity; and a gasket having electric insulation, the gasket being compressed between the sealing plate and a portion of the crimp part facing the groove part and between the sealing plate and an inner surface of the groove part. The case is electrically connected to the first electrode. The sealing plate is electrically connected to the second electrode. The opening rim does not contact the gasket.

Advantageous Effect of Invention

In the present disclosure, a collector member can be bonded onto a portion of the crimp part of the case which does not contact the gasket, providing an electricity storage device that suppresses deterioration of the gasket in the sealing body.

DESCRIPTION OF EMBODIMENT

Figure 1:
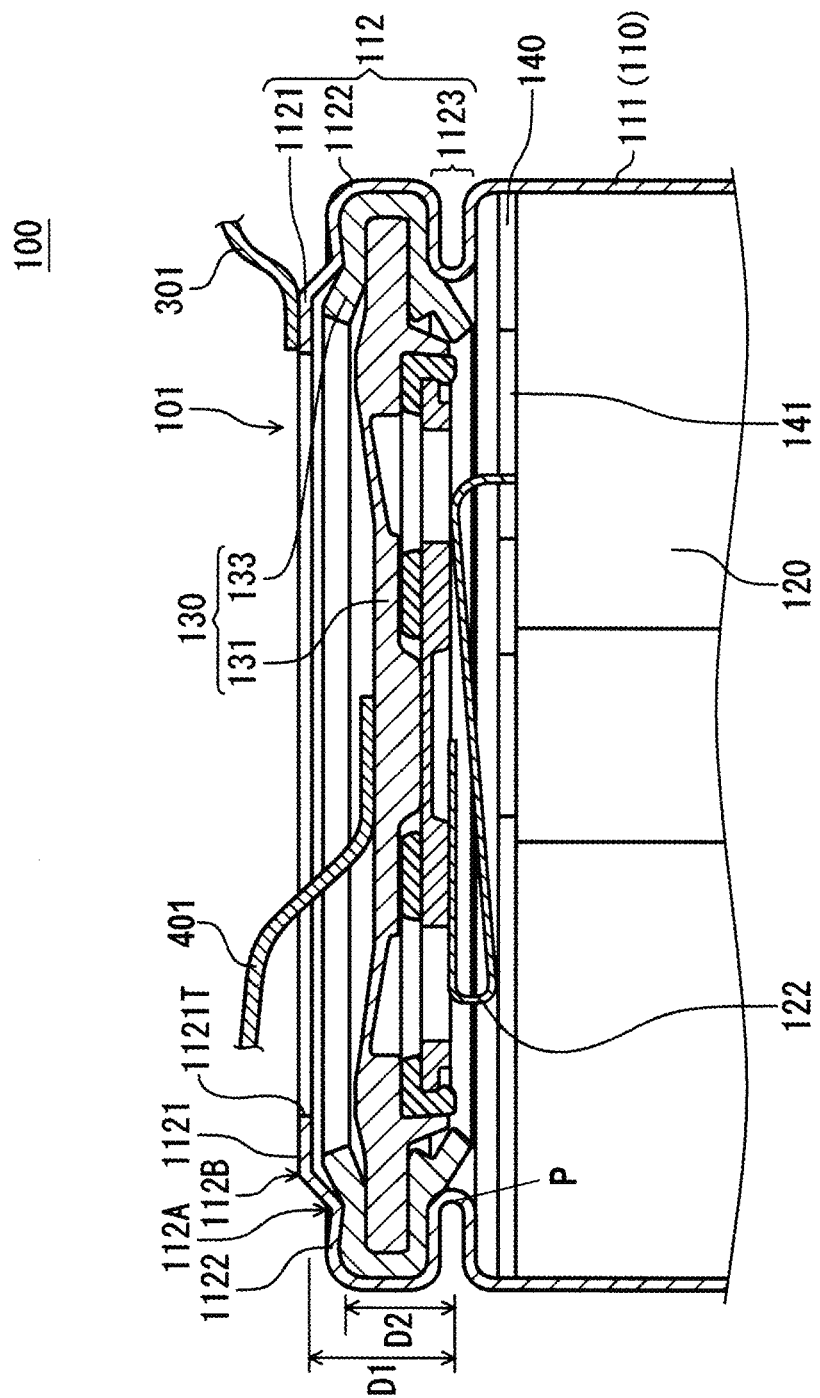
FIG. 1 is a sectional view of an electricity storage device in accordance with an exemplary embodiment of the present disclosure.

An electricity storage device in accordance with one aspect of the present disclosure includes: an electrode group including a first electrode and a second electrode; a case accommodating the electrode group therein, the case having an opening provided therein; and a sealing body covering the opening of the case. The case includes a tubular part, a curved part connected to one end of the tubular part, and a bottom part closing another end of the tubular part. The curved part includes an opening rim, a crimp part connected to the opening rim, and a groove part connected to the crimp part, the crimp part being located outward from the opening rim along a radial direction of the tubular part, the groove part being recessed to protrude inward in the radial direction of the tubular part and having an annular shape. The sealing body includes: a sealing plate having conductivity; and a gasket having electric insulation, the gasket being compressed between the sealing plate and a portion of the crimp part facing the groove part and between the sealing plate and an inner surface of the groove part. The case is electrically connected to the first electrode. The sealing plate is electrically connected to the second electrode. The opening rim does not contact the gasket.

Since the opening rim does not contact the gasket, heat of welding is hardly transferred to the gasket even when a first collector member is welded to the opening rim. Accordingly, deterioration of the gasket is suppressed. For example, a first collector lead having the same polarity as the first electrode and led out from the first collector member is welded onto an outer surface of the opening rim. On the other hand, a second collector lead having the same polarity as the second electrode and led out from a second collector member is welded to an outer surface of the sealing plate. A material of the gasket is, for example, polypropylene (PP), polyphenylene sulfide (PPS), polybutylene terephthalate (PBT), perfluoroalkoxy alkane (PFA), and polyether ether ketone (PEEK).

The curved part may include a step at a boundary between the opening rim and the crimp part, such that a distance D1 between the opening rim and the groove part in an axial direction of the tubular part is larger than a distance D2 between the crimp part and the groove part in the axial direction. Distance D1 is the shortest distance between the opening rim and the groove part in the axial direction. Distance D2 is the shortest distance between the crimp part and the groove part in the axial direction. A height of the groove part that constitutes a reference of D1 and D2 is a height of the groove part at the deepest point of the groove part (which is closest to an axis of the tubular part). The heat of welding is hardly transferred to the gasket due to the relation of D1>D2, and therefore the deterioration of the gasket can be further suppressed.

To easily achieve the relation of D1>D2, the curved part may include a first bending portion at a boundary between the opening rim and the crimp part. The first bending portion is directed opposite to a bending direction of the crimp part. The first bending portion can be easily formed on the case before forming the crimp part. The gasket is most strongly compressed by the first bending portion. In other words, the first bending portion allows the crimp part to easily increase a compression rate of the gasket. In the electricity storage device of the present disclosure, the first bending portion may not most strongly compress the gasket. A flat portion is formed in the crimp part, and this flat portion may most strongly compress the gasket. Still more, an inclining surface descending outward in the radial direction of the electricity storage device may most strongly compress the gasket.

The curved part may include a second bending portion between the first bending portion and a tip of the opening rim. The second bending portion is directed toward in the bending direction of the crimp part. The second bending portion prevents the tip of the opening rim from excessively protruding away from the sealing body in the axial direction of the tubular part. An angle formed between the opening rim and the radial direction of the tubular part becomes close to 0° by controlling an inner angle of the second bending portion. In other words, the opening rim may include a flat portion in the radial direction of the tubular part. This flat portion facilitates welding to the first collector member. The first collector lead having the same polarity as the first electrode and led out from the first collector member can be easily welded onto an outer surface of the flat portion of the opening rim.

At least a part of the opening rim may include a thin portion thinner than the crimp part. A notch may be formed in a surface of the curved part facing the gasket. The notch is demarcated to include the thin portion. This configuration may provide a space between the thin portion and the gasket, similarly to the configuration in which the opening rim is bent from the crimp part. This space suppresses transferring, to the gasket, of heat generated when the thin portion is bonded to the collector member. The thin portion provides the space between the gasket and the opening rim without bending the crimp part or the opening rim away from the case. This configuration suppresses an increase of dimension of the electricity storage device in a height direction. The entire opening rim may be the thin portion thinner than the crimp part or a part of the opening rim may be the thin portion. In the curved part, the stepped surface or the inclining surface may be formed on the crimp part or an inner surface (surface facing the gasket) of the thin portion of the opening rim.

Types of the electricity storage device are not particularly limited, and include primary batteries, rechargeable batteries, lithium ion capacitors, electric double layer capacitors, and solid electrolyte capacitors. In particular, nonaqueous electrolyte capacitors (including total solid batteries) such as lithium ion rechargeable batteries that have high energy density are preferably applicable.

The electricity storage device in accordance with an exemplary embodiment of the present disclosure will detailed below with reference to the drawings. However, the present disclosure is not limited thereto.

Figure 2:
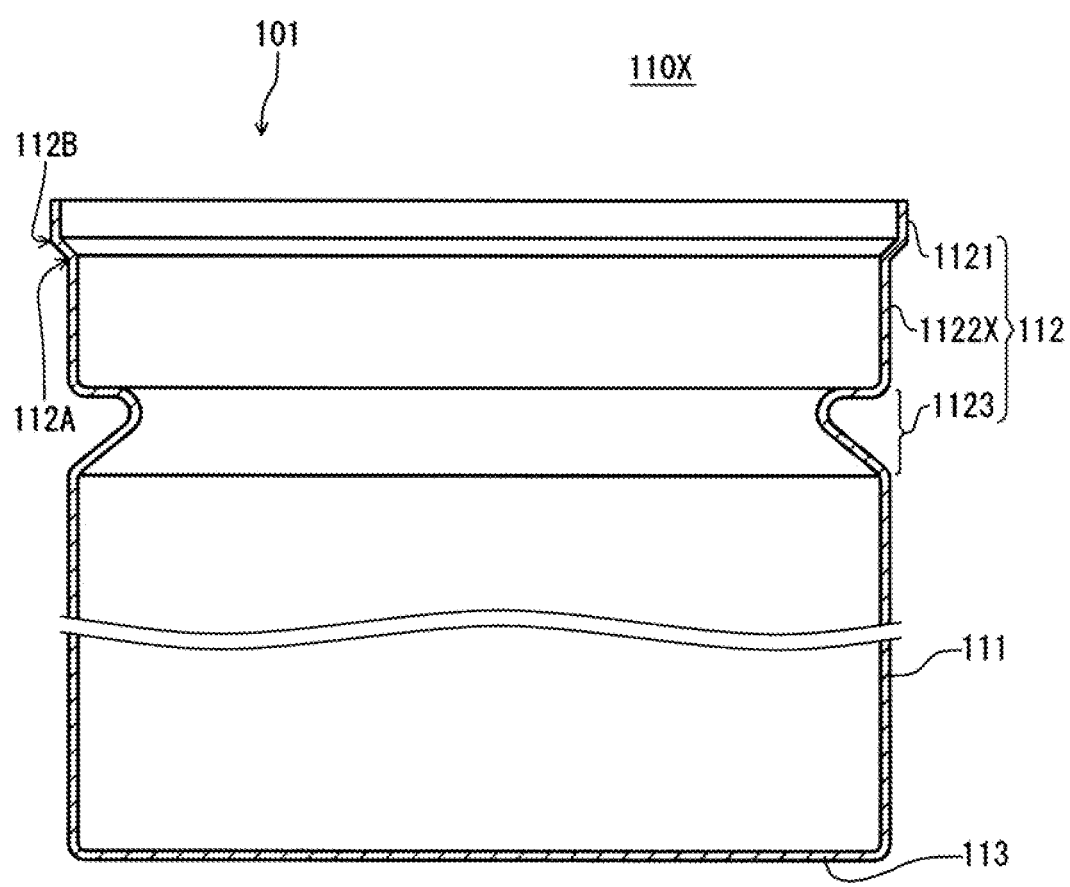
FIG. 2 is a sectional view of the electricity storage device shown in FIG. 1 for illustrating a structure before processing a case of the electricity storage device.

FIG. 1 is a sectional view of electricity storage device 100 in accordance with the exemplary embodiment for illustrating an example of a structure thereof. FIG. 2 is a sectional view of the electricity storage device shown in FIG. 1 for illustrating a structure before processing a case of the electricity storage device. Electricity storage device 100 includes electrode group 120 including a first electrode and a second electrode, case 110 accommodating therein electrode group 120 and having opening 101, and sealing body 130 covering opening 101 of case 110. Case 110 includes tubular part 111 having a cylindrical shape, curved part 112 connected to one end of tubular part 111, and bottom part 113 closing another end of tubular part 111.

Curved part 112 includes opening rim 1121, crimp part 1122 connected to opening rim 1121 and located outward from opening rim 1121 in the radial direction of tubular part 111, and groove part 1123 having connected to crimp part 1122. Groove part 1123 has an annular shape, and is recessed to protrude inward in the radial direction of tubular part 111.

Sealing body 130 includes sealing plate 131 having conductivity and gasket 133 having electric insulation. Gasket 133 is compressed between sealing plate 131 and a portion of crimp part 1122 facing groove part 1123 and between sealing plate 131 and an inner surface of groove part 1123.

Case 110 is electrically connected to the first electrode. Sealing plate 131 is electrically connected to the second electrode. Opening rim 1121 does not contact gasket 133, and a space is provided between opening rim 1121 and gasket 133, thereby preventing heat applied to opening rim 1121 from being transferred to gasket 133.

Internal insulating plate 140 is disposed between electrode group 120 and sealing body 130, and prevents electrode group 120 from contacting sealing body 130. Predetermined lead hole 141 is formed in internal insulating plate 140. The first electrode constituting electrode group 120 is electrically connected to case 110. Therefore, case 110 has the same polarity as the first electrode. Lead 122 led out from the second electrode passes through lead hole 141 and electrically connected to an inner surface of sealing plate 131. Therefore, sealing plate 131 has the same polarity as the second electrode.

First collector lead 301 having the same polarity as the first electrode is led out from the first collector member and welded to an outer surface of opening rim 1121. On the other hand, second collector lead 401 having the same polarity as the second electrode is led out from the second collector member and welded to an outer surface of sealing plate 131.

Figure 3:
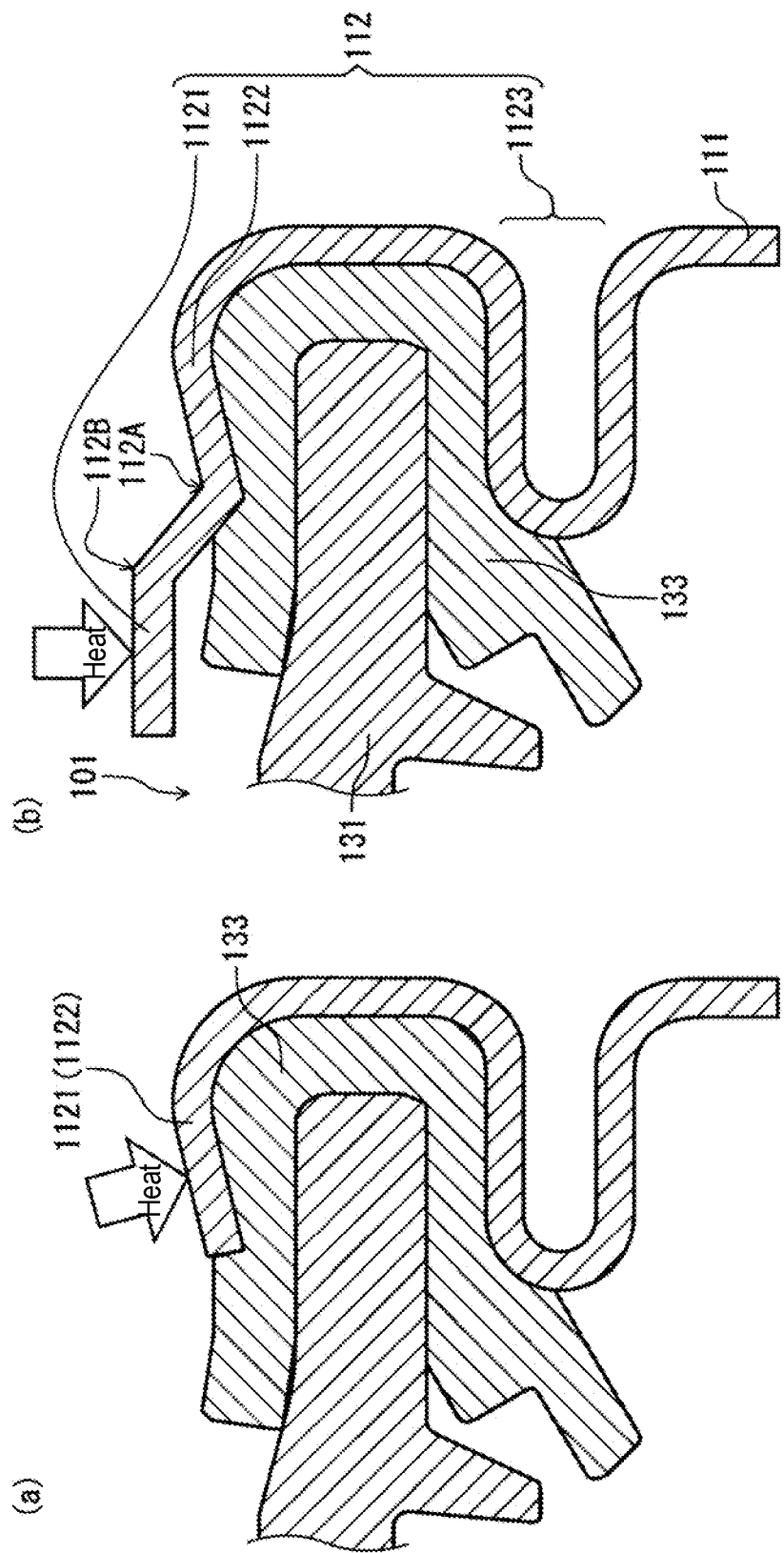
FIG. 3 illustrates a thermal impact on a gasket provided in a sealing body.

FIG. 3 illustrates a thermal impact on gasket 133 provided in sealing body 130. As illustrated in FIG. 3(a), in the case that opening rim 1121 is not different from crimp part 1122 and in contact with gasket 133, the heat applied to opening rim 1121 is directly transferred to gasket 133 at a most compressed portion where a load is applied, resulting in deteriorating gasket 133. On the other hand, as illustrated in FIG. 3(b), in the case that opening rim 1121 is different from crimp part 1122 and does not contact gasket 133, the heat applied to opening rim 1121 is hardly transferred to gasket 133, resulting in suppressing the deterioration of gasket 133.

A boundary between opening rim 1121 and crimp part 1122 is stepped so that distance D1 between opening rim 1121 and groove part 1123 in the axial direction of tubular part 111 becomes larger than distance D2 between crimp part 1122 and groove part 1123 in the axial direction. Distance D1 is the shortest distance between an inner surface of opening rim 1121 and groove part 1123 in the axial direction. Distance D2 is the shortest distance between an inner surface of crimp part 1122 and groove part 1123 in the axial direction. A height of the groove part constituting a reference of D1 and D2 is a height of the groove part at the deepest point of the groove part which is closest to the axis of the tubular part (indicated by point P in FIG. 1).

Curved part 112 includes first bending portion 112A at the boundary between opening rim 1121 and crimp part 1122. First bending portion 112A is bent in a direction opposite to a bending direction of crimp part 1122. Gasket 133 is most strongly compressed by first bending portion 112A.

Curved part 112 includes second bending portion 112B between first bending portion 112A and tip 1121T of opening rim 1121. Second bending portion 112B is bent toward the same side as the bending direction of crimp part 1122. Second bending portion 112B prevents tip 1121T of opening rim 1121 from excessively protruding away from sealing body 130 in the axial direction of tubular part 111. An angle formed by opening rim 1121 and tubular part 111 in the radial direction (horizontal direction perpendicular to the axial direction) is substantially 0°. Accordingly, first collector lead 301 is easily welded to opening rim 1121.

At least a part of opening rim 1121 may have a thin portion thinner than crimp part 1122. A notch demarcated to include the thin portion may be provided in a surface of curved part 112 facing gasket 133.

Next, a method of manufacturing the electricity storage device in accordance with the exemplary embodiment will be described below. FIGS. 4A to 4J illustrate first to tenth steps of a manufacturing process of the electricity storage device. To facilitate understanding, each diagram illustrates case 110, sealing plate 131, gasket 133, and outer shapes of predetermined dies, but other components are generally omitted from illustration.

First Step

Figure 4A:
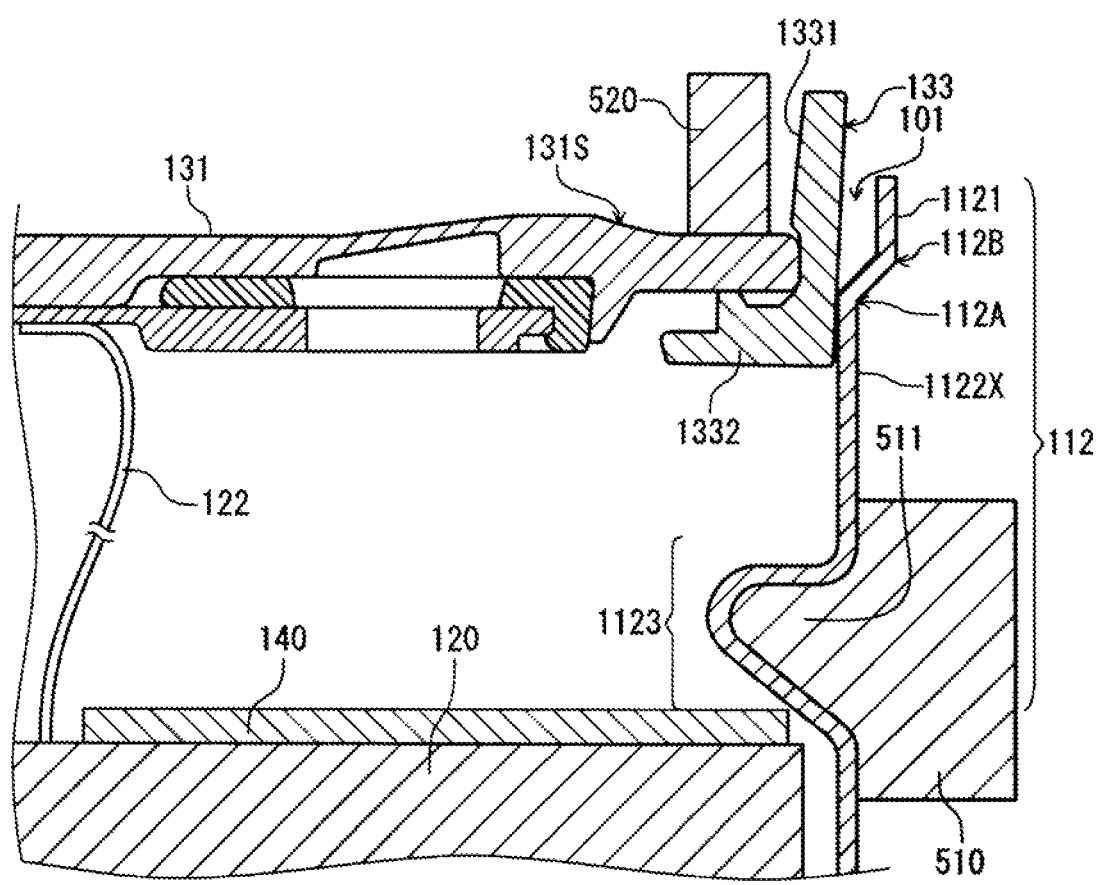
FIG. 4A is a first step of a manufacturing process of the electricity storage device in accordance with the exemplary embodiment of the present disclosure.

First, electrode group 120, a precursor (case precursor 110X) of case 110, and sealing body 130 are prepared. Electrode group 120 is accommodated in case precursor 110X, and internal insulating plate 140 is disposed. Then, a lead (not illustrated) led out from the first electrode is electrically connected to case 110, and lead 122 led out from the second electrode is electrically connected to the inner surface of sealing plate 131 (FIG. 4A). Then, groove part 1123 having the annular shape is formed in case precursor 110X at a position which is slightly above internal insulating plate 140 toward opening 101.

Case precursor 110X includes tubular part 111 having a cylindrical shape, curved part 112 connected to one end of tubular part 111, and bottom part 113 closing another end of tubular part 111 (see FIG. 2). Curved part 112 includes crimp region 1122X connected to opening rim 1121 and groove part 1123 connected to crimp region 1122X. Groove part 1123 has an annular shape. Opening rim 1121 includes first bending portion 112A that expands a diameter of opening 101 outward along the radial direction of tubular part 111 and second bending portion 112B that returns the diameter of opening 101 inward along the radial direction of tubular part 111.

Sealing body 130 includes sealing plate 131 and gasket 133. Sealing plate 131 has a disk shape. Gasket 133 includes wall 1331 having a tubular shape and annular base part 1332 having an inner flange shape supporting an inner surface of a periphery 131S of sealing plate 131, thus having a tubular shape.

Second Step

Figure 4B:
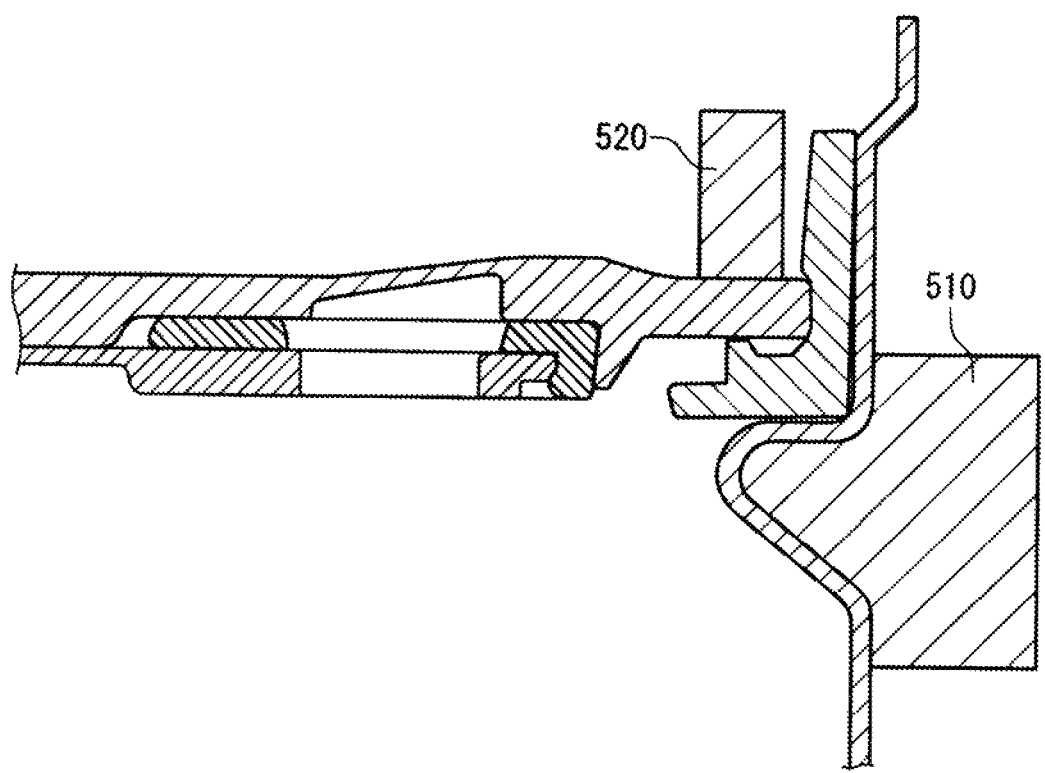
FIG. 4B is a second step of the manufacturing process.

Next, first die 510 including annular protrusion 511 on an inner peripheral surface of the die is fitted into groove part 1123 from outside along the radial direction of tubular part 111. Still more, annular second die 520 is pressed onto the outer surface of sealing plate 131 to press sealing plate 131 along the axial direction of tubular part 111 (FIG. 4B). This step allows sealing body 130 to be supported on groove part 1123.

Third Step

Figure 4C:
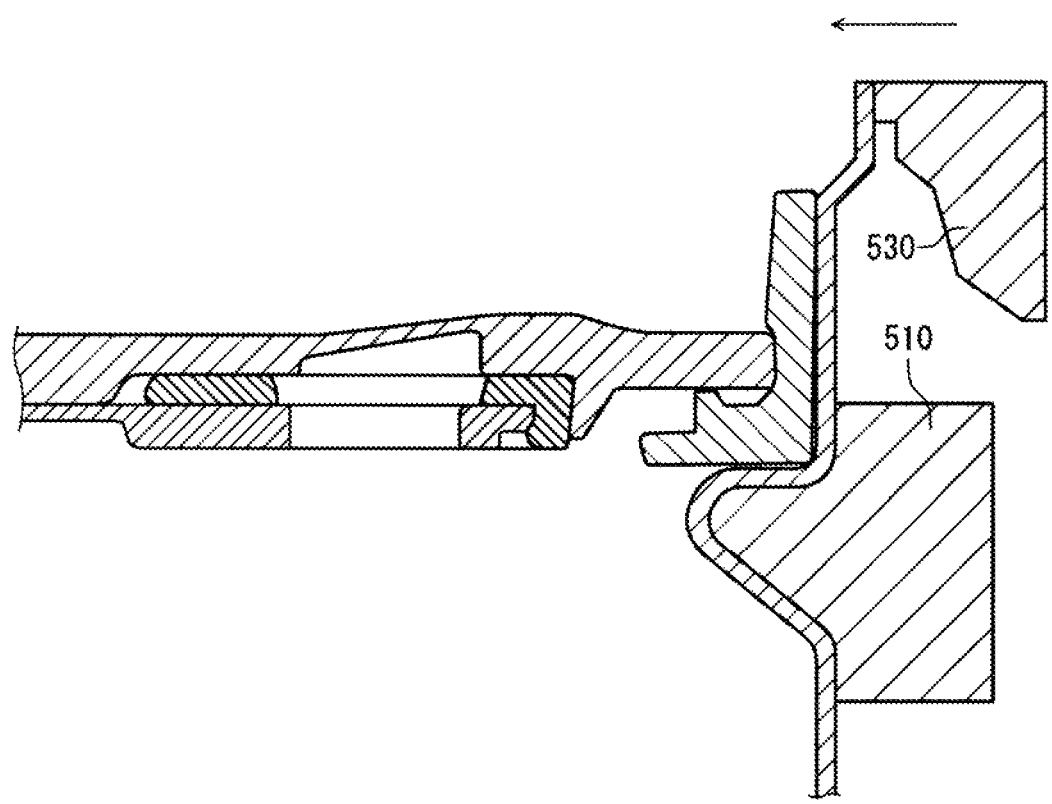
FIG. 4C is a third step of the manufacturing process.

Next, third die 530 that is rotatable contacts the outer surface of opening rim 1121 (FIG. 4C). Third die 530 has a tapered surface with plural steps in a circumferential surface of the third die such that a diameter of the case gradually decreases from opening 101 toward bottom part 113 along the axial direction of tubular part 111.

Fourth Step

Figure 4D:
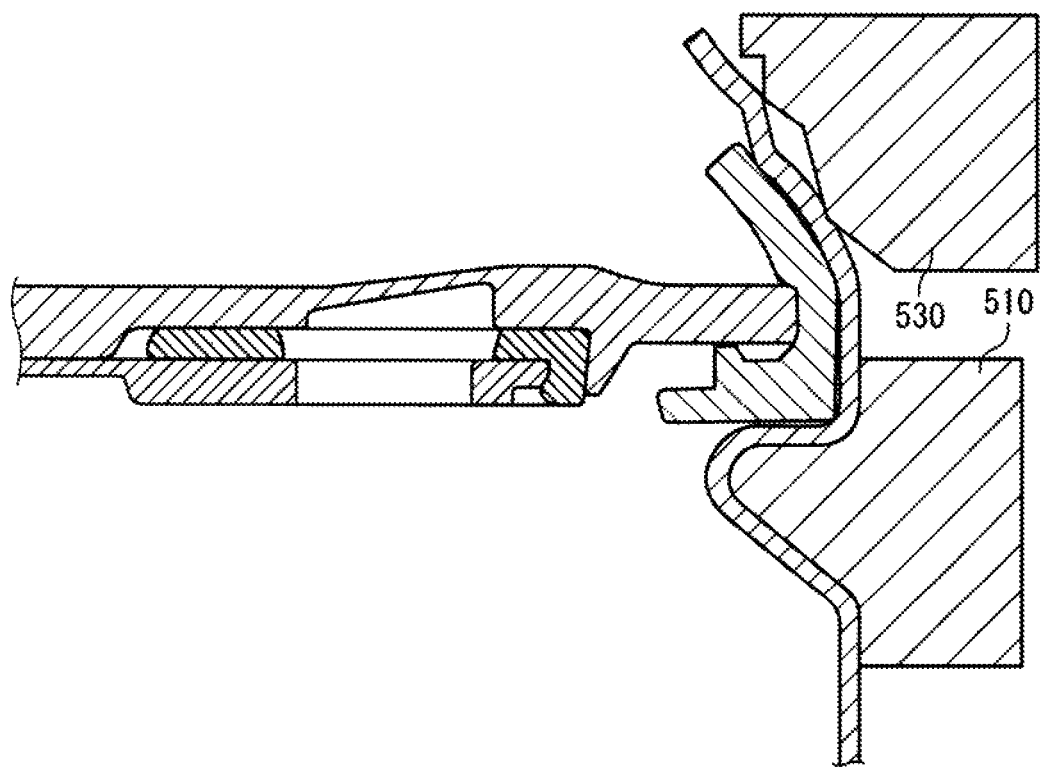
FIG. 4D is a fourth step of the manufacturing process.

Next, while third die 530 is rotated, opening rim 1121 is pushed in from the outside to inside in the radial direction to bend opening rim 1121 inward (FIG. 4D).

Fifth Step

Figure 4E:
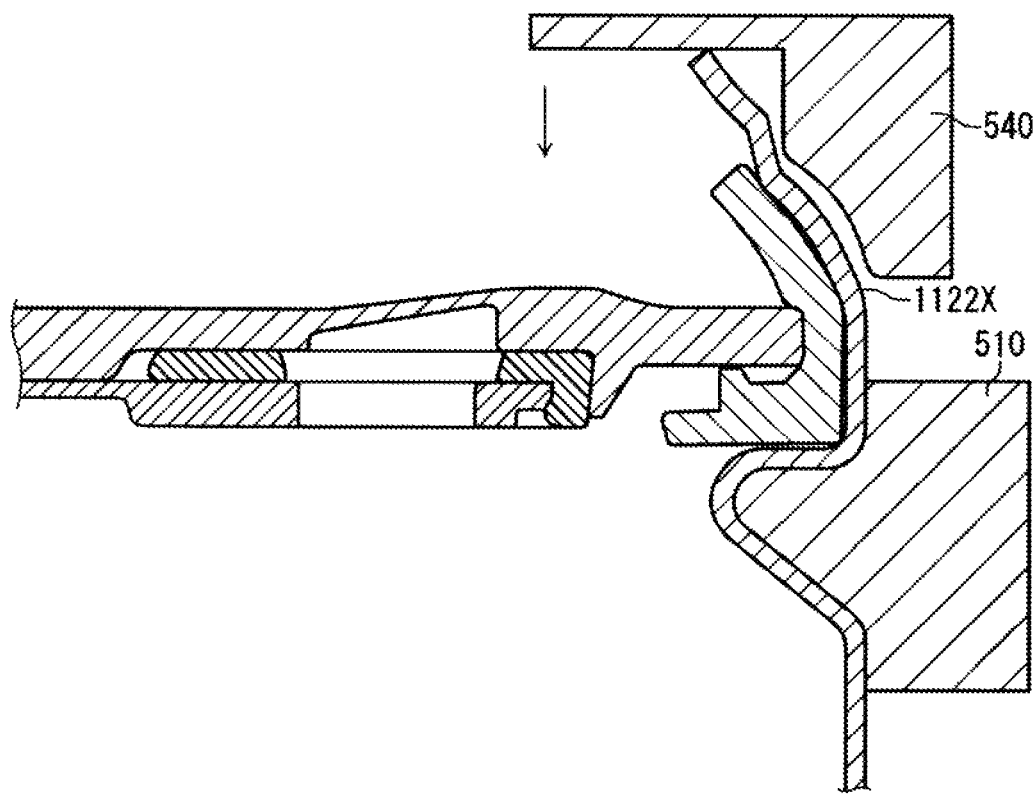
FIG. 4E is a fifth step of the manufacturing process.

Next, annular fourth die 540 contacts crimp region 1122X (FIG. 4E). Crimp region 1122X is located between first bending portion 112A and groove part 1123 in curved part 112, and is to be crimp part 1122. Fourth die 540 has a tubular concave surface configured to contact crimp region 1122X. An inner diameter of the concave surface decreases toward a portion of the die configured to contact first bending portion 112A. Crimp region 1122X, the periphery 131S of sealing plate 131, and gasket 133 are arranged between this concave surface and annular protrusion 511 of first die 510.

Sixth Step

Figure 4F:
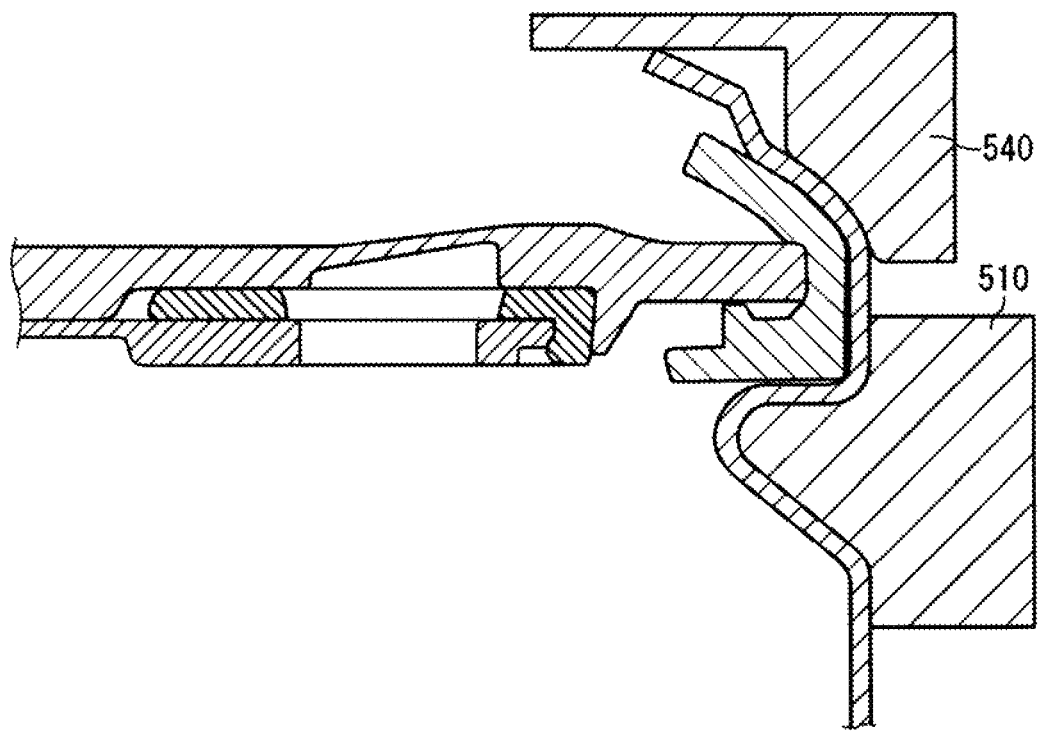
FIG. 4F is a sixth step of the manufacturing process.

Next, fourth die 540 is pressed onto the outer surface of crimp region 1122X to press crimp region 1122X together with gasket 133 along the axial direction of tubular part 111 between fourth die 540 and annular protrusion 511 of first die 510 (FIG. 4F).

Seventh Step

Figure 4G:
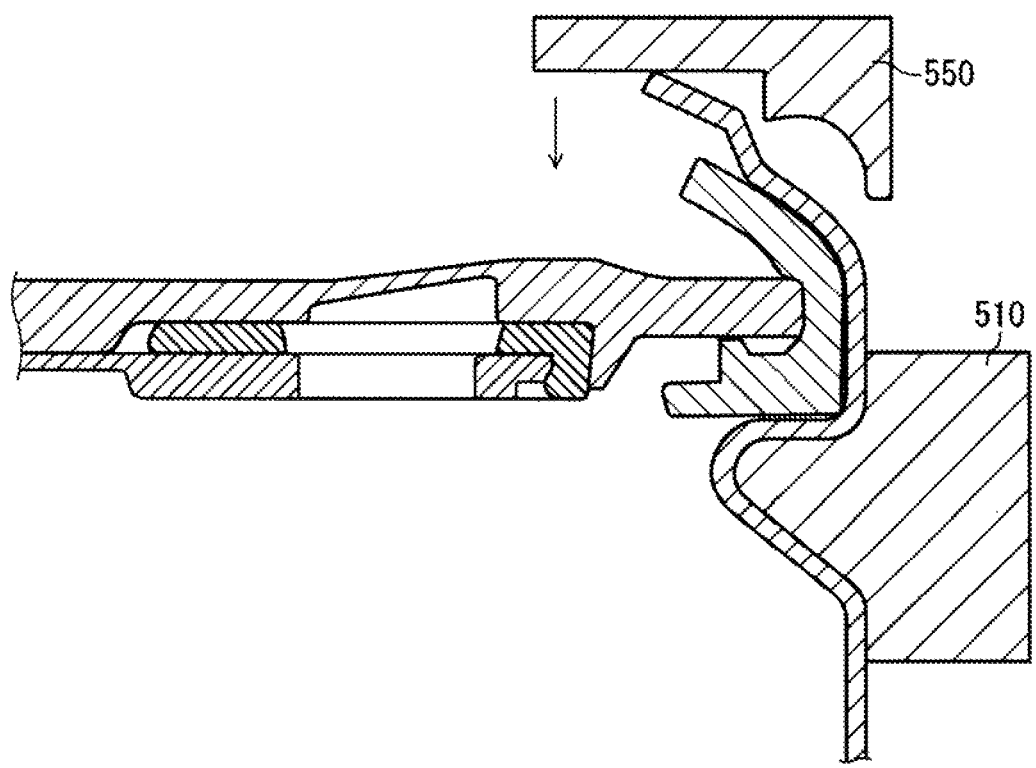
FIG. 4G is a seventh step of the manufacturing process.

Next, fifth die 550 having a concave surface with radius of curvature smaller than the concave surface of fourth die 540 is prepared. The radius of curvature is defined as a minimum radius of curvature of a concave surface of the die provided by cutting the die along a plane including the axis of the tubular part (FIG. 4G).

Eighth Step

Figure 4H:
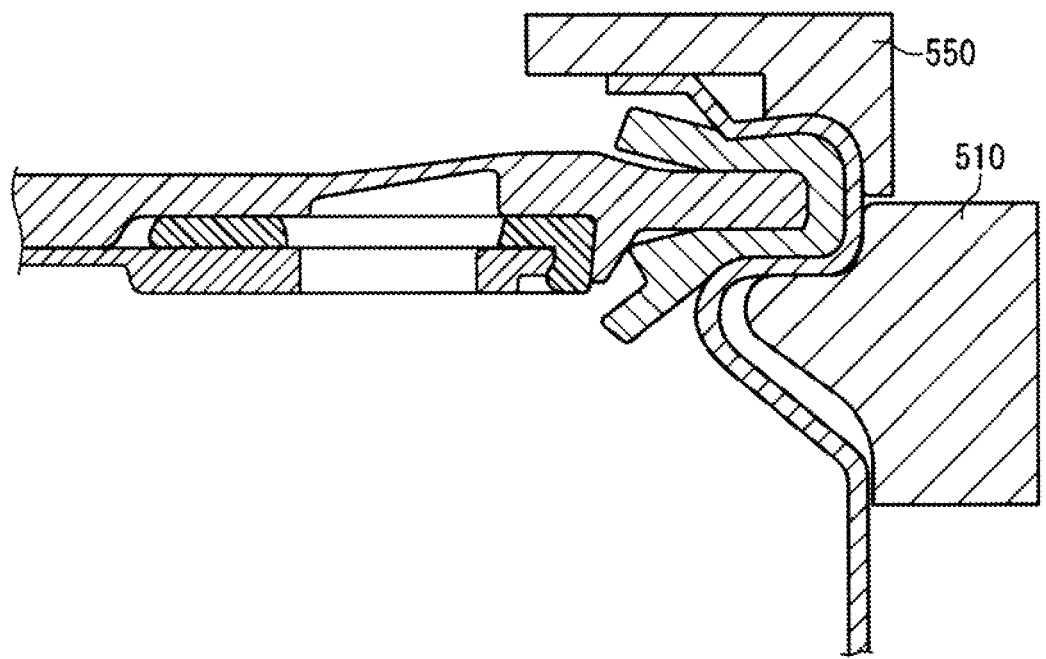
FIG. 4H is an eighth step of the manufacturing process.

Next, fifth die 550 is strongly pressed onto the outer surface of crimp region 1122X to further press crimp region 1122X together with gasket 133 along the axial direction of tubular part 111 between fifth die 550 and annular protrusion 511 of first die 510 (FIG. 4H).

The concave surface of fifth die 550 presses crimp region 1122X along the axial direction to just contacting opening rim 1121. Therefore, almost no stress is applied to opening rim 1121. On the other hand, crimp region 1122X receives a pressing force from the concave surface of fifth die 550, and strongly compresses gasket 133 More specifically, gasket 133 is compressed between sealing plate 131 and crimp part 1122 (particularly a portion of the gasket facing groove part 1123 of crimp part 1122) and between sealing plate 131 and the inner surface of groove part 1123. First bending portion 112A bites gasket 133.

Ninth Step

Figure 4I:
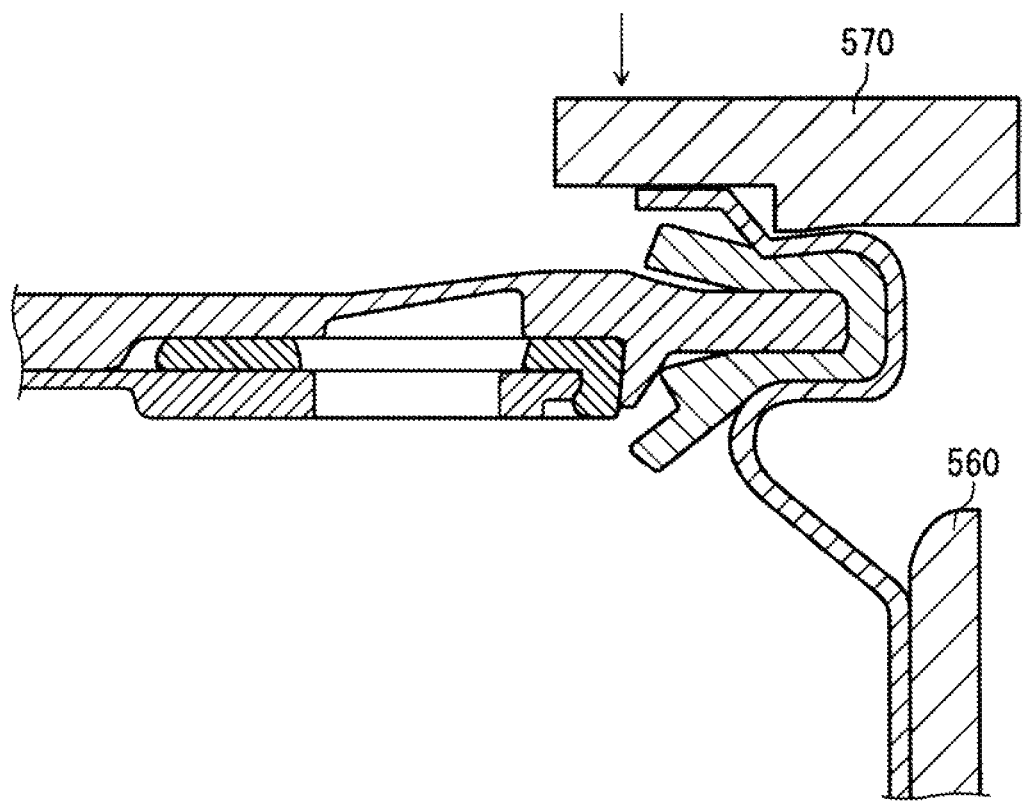
FIG. 4I is a ninth step of the manufacturing process.

Next, first die 510 is removed away from groove part 1123, and a circumferential surface of tubular part 111 is fixed by tubular sixth die 560 having an inner circumferential surface facing the circumferential surface of tubular part 111. Then, a pressing surface of annular seventh die 570 contacts, along the axial direction, crimp part 1122 formed by previous steps (FIG. 4I)

Tenth Step

Figure 4J:
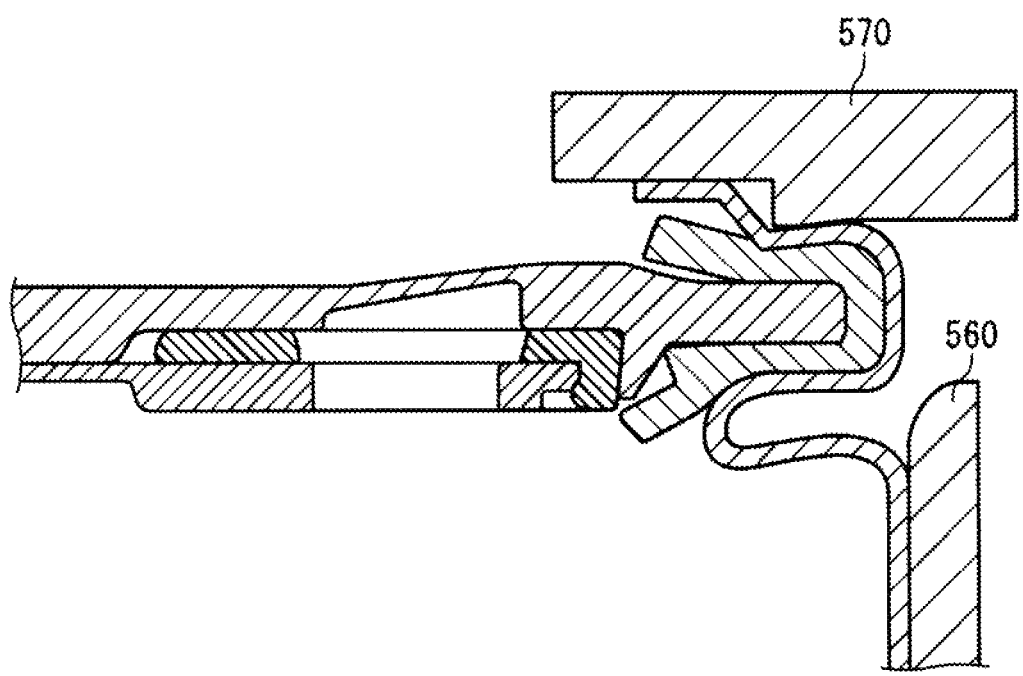
FIG. 4J is a tenth step of the manufacturing process.

Next, seventh die 570 further strongly presses crimp part 1122 along the axial direction (FIG. 4J). As a result, groove part 1123 is compressed along the axial direction to increase sealing property of crimp part 1122.

The above describes an example of a cylindrical electricity storage device. However, the present disclosure is applicable to various shapes (e.g., rectangular shape) of electricity storage devices.

INDUSTRIAL APPLICABILITY

The electricity storage device according to the present disclosure is effectively applicable, in particular, to a power source of vehicles such as hybrid vehicles and electric vehicles.

REFERENCE MARKS IN THE DRAWINGS 100 electricity storage device
101 opening
110 case
110X case precursor
111 tubular part
112 curved part
1121 opening rim
1121T tip
1122 crimp part
1122X crimp region
1123 groove part
112A first bending portion
112B second bending portion
113 bottom part
120 electrode group
122 lead
130 sealing body
131 sealing plate
133 gasket
140 internal insulating plate
141 lead hole
301 first collector lead
401 second collector lead
510 first die
511 annular protrusion
520 second die
530 third die
540 fourth die
550 fifth die
560 sixth die
570 seventh die

The invention claimed is:

1. An electricity storage device comprising:
an electrode group including a first electrode and a second electrode;
a case accommodating the electrode group therein, the case having an opening provided therein; and
a sealing body covering the opening of the case, wherein
the case includes a tubular part, a curved part connected to one end of the tubular part, and a bottom part closing another end of the tubular part,
the curved part includes an opening rim, a crimp part connected to the opening rim, and a groove part connected to the crimp part, the crimp part being located outward from the opening rim along a radial direction of the tubular part, the groove part being recessed to protrude inward in the radial direction of the tubular part and having an annular shape,
the sealing body includes:
a sealing plate having conductivity; and
a gasket having electric insulation, the gasket being compressed between the sealing plate and a portion of the crimp part facing the groove part and between the sealing plate and an inner surface of the groove part,
the case is electrically connected to the first electrode,
the sealing plate is electrically connected to the second electrode,
the opening rim does not contact the gasket,
the curved part includes a first bending portion at a boundary between the opening rim and the crimp part, the first bending portion being directed to a direction opposite to a bending direction of the crimp part,
the curved part further includes a second bending portion between the first bending portion and a tip of the opening rim, the second bending portion being directed to a direction same as the bending direction of the crimp part, and
the second bending portion does not contact the gasket.

2. The electricity storage device according to claim 1, wherein the curved part includes a step at a boundary between the opening rim and the crimp part, such that a distance D1 between the opening rim and the groove part in an axial direction of the tubular part is larger than a distance D2 between the crimp part and the groove part in the axial direction.

3. The electricity storage device according to claim 1, wherein
 a first collector lead having a same polarity as the first electrode is welded to an outer surface of the opening rim which does not contact the gasket, and
 a second collector lead having a same polarity as the second electrode is welded to an outer surface of the sealing plate.

4. The electricity storage device according to claim 1, wherein
 at least a part of the opening rim includes a thin portion thinner than the crimp part, and
 a notch is formed in a surface of the curved part facing the gasket, the notch being demarcated to include the thin portion.

5. An electricity storage device comprising:
 an electrode group including a first electrode and a second electrode;
 a case accommodating the electrode group therein, the case having an opening provided therein; and
 a sealing body covering the opening of the case, wherein:
 the case includes a tubular part, a curved part connected to one end of the tubular part, and a bottom part closing another end of the tubular part,
 the curved part includes an opening rim, a crimp part connected to the opening rim, and a groove part connected to the crimp part, the crimp part being located outward from the opening rim along a radial direction of the tubular part, the groove part being recessed to protrude inward in the radial direction of the tubular part and having an annular shape,
 the sealing body includes:
  a sealing plate having conductivity; and
  a gasket having electric insulation, the gasket being compressed between the sealing plate and a portion of the crimp part facing the groove part and between the sealing plate and an inner surface of the groove part,
 the case is electrically connected to the first electrode,
 the sealing plate is electrically connected to the second electrode,
 the opening rim does not contact the gasket,
 a first collector lead having a same polarity as the first electrode is welded to an outer surface of the opening rim which does not contact the gasket, and
 a second collector lead having a same polarity as the second electrode is welded to an outer surface of the sealing plate.

* * * * *